United States Patent [19]

Bernkrant

[11] 4,139,202
[45] Feb. 13, 1979

[54] O-RING RETAINER CAP AND VALVE PROTECTOR

[76] Inventor: Keith D. Bernkrant, P.O. Box 520691, Miami, Fla. 33152

[21] Appl. No.: 832,295

[22] Filed: Sep. 12, 1977

[51] Int. Cl.² .................. F16J 15/00; A61M 16/00
[52] U.S. Cl. ........................... 277/11; 128/142 R
[58] Field of Search ............... 277/9, 10, 11, 189; 128/142 R, 142.2, 140 R; 215/260, 317, 302; 285/180, 311

[56] References Cited

U.S. PATENT DOCUMENTS

| 387,336 | 8/1888 | Barrett | 285/180 |
|---|---|---|---|
| 3,178,191 | 4/1965 | Dodd et al. | 277/189 |
| 3,202,007 | 8/1965 | Stratienko | 277/9 |
| 3,975,026 | 8/1976 | Boyle et al. | 277/9 |
| 3,976,067 | 8/1976 | Amlong | 128/142.2 |
| 3,983,869 | 10/1976 | Suzuki | 128/142 R |

Primary Examiner—Robert I. Smith
Attorney, Agent, or Firm—Oltman and Flynn

[57] ABSTRACT

The present retainer cap and valve protector fits over the valve head on a diver's oxygen tank to retain in place the usual O-ring which provides a fluid-tight seal between the valve head and an outlet flow regulator releasably attached to it. The retainer cap has a flexible, resilient, annular lip which springs back across the O-ring groove in the valve head to hold the O-ring in place when the outlet flow regulator is detached.

11 Claims, 5 Drawing Figures

O-RING RETAINER CAP AND VALVE PROTECTOR

BACKGROUND OF THE INVENTION

Scuba divers use an air tank with a valve head at one end having a passage leading from the interior of the tank to an outlet port in one side of the valve head. An outlet flow regulator for regulating the air flow to the diver's breathing mask is releasably attached to this valve head. To provide a fluid-tight seal between the valve head and the outlet flow regulator, an O-ring of rubber-like material is seated in an annular groove surrounding the outlet port in the side of the valve head. The outlet flow regulator has a rigid annular projection on its inlet side which extends into this groove and deforms the O-ring to provide an effective seal when the outlet flow regulator is attached to the valve head. When the outlet flow regulator is removed from the valve head the O-ring may pop out or drop out of the groove.

The present invention is directed toward the solution of this problem plus providing protection for external and internal portions of the head valve.

The following U.S. patents were found in a novelty search on the present invention: U.S. Pat. Nos: Maack 3,021,034; Kessler 3,067,900; Martin et al 3,937,442; Lorenz 1,512,347; and Vouillemin 3,920,143.

SUMMARY OF THE INVENTION

In accordance with the presently preferred embodiment of this invention, the O-ring is retained in the groove by a retainer cap of rubber-like material which has a snug, sliding fit on the valve head. The retainer cap and valve protector has an opening in one side which registers with the outlet port in the valve head and is bordered by a flexible, resilient, annular lip which overlies the O-ring groove. This lip is deformed outwardly against the outside wall of this groove by the annular projection on the outlet flow regulator when the regulator is attached to the valve head. However, when the flow regulator is detached from the valve head this annular lip on the retainer cap immediately springs back across the groove to hold the O-ring in place. On the opposite side, the retainer cap has an opening for passing the usual clamping screw which is threadedly mounted on a yoke attached to the outlet flow regulator for straddling the valve head.

A principal object of this invention is to provide a novel O-ring retainer cap for use on the valve head on a diver's tank and to cover and protect the head valve.

Another object of this invention is to provide such a retainer cap in combination with the valve head on the diver's tank and the usual outlet flow regulator which is detachably mounted on the valve head so as to deform the O-ring to provide a fluid tight seal.

Another object of this invention is to provide such a retainer cap which does not interfere with the fluid-tight seal provided by the O-ring when the outlet flow regulator is attached to the valve head on the diver's tank.

Further objects and advantages of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Figure 1:
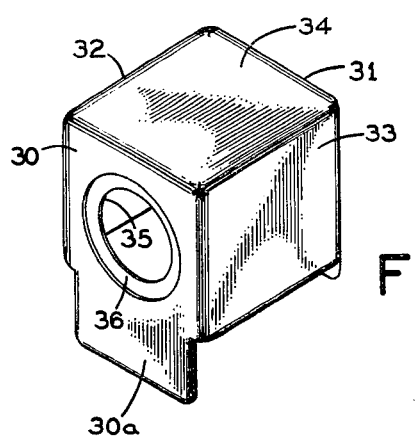
FIG. 1 is a perspective view of the present O-ring retainer cap.
Figure 2:
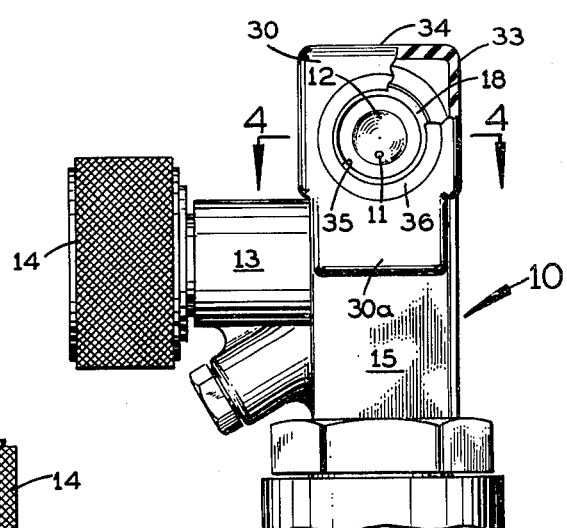
FIG. 2 is an elevational view, partly broken away for clarity, showing this retainer cap in place on the valve head of a diver's tank before an outlet flow regulator is connected to the valve head.
Figure 4:
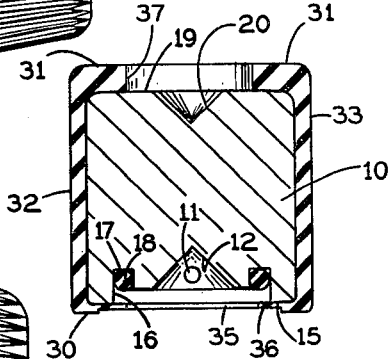
FIG. 4 is a cross-section taken along the line 4—4 in FIG. 2.

Referring first to FIG. 2, the usual diver's air tank has a valve head 10 attached to one end and formed with a passageway 11 (FIG. 5) for passing air from the tank to an outlet port 12. The valve head carries a shutoff valve 13 of known design which is operated by a knurled, rotatable knob 14 to control the flow of air through the passage 11 to the outlet port. As shown in FIG. 4, the valve head 10 is generally rectangular in cross-section, with rounded corners.

In its generally flat side face 15 (FIGS. 4 and 5) the valve head is formed with a shallow circular depression or recess 16, at the middle of which is located the outlet port 12, which in the embodiment shown is conical. At the outer edge of the recess 16 the valve head presents a circular groove 17 spaced from and concentrically surrounding the outlet port 12. An O-ring 18 of rubber-like material is seated in this groove 17.

The generally flat opposite side face 19 of the valve head is formed with a conical recess 20 (FIGS. 4 and 5) which is substantially aligned with the outlet port 12.

Figure 3:
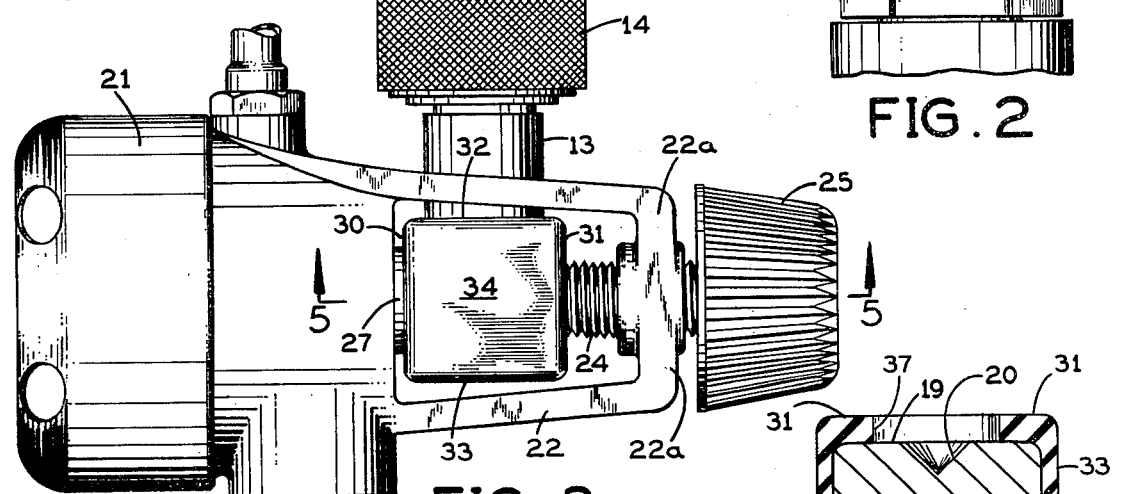
FIG. 3 is a top plan view showing the assembly of the valve head, the outlet flow regulator and the present O-ring retainer cap before the clamping screw is fully tightened.

An outlet flow regulator 21 of known design (FIGS. 3 and 5) is detachably mounted on the tank-mounted valve head 10 in fluid-tight fashion. As shown in FIG. 3, this regulator has a rigid mounting yoke 22 which straddles the valve head 10 and presents an outer end wall 22a spaced outwardly from and parallel to the side face 19 of the valve head. The outer end wall of the yoke has a screw-threaded opening 23 (FIG. 5) which threadedly receives a clamping screw 24. The clamping screw carries a knob 25 on its outer end which the user may grip manually to turn the screw. At its inner end the clamping screw has a rounded conical tip 26 which is snugly engageable in the conical seat 20 in the adjacent side face 19 of the valve head.

At the opposite side of the yoke the body or housing of the outlet flow regulator 21 has the usual rigid annular projection 27, which fits slidably into the O-ring groove 17 in the adjacent side face 15 of the valve head. The outlet flow regulator carries a screen 28 inside this annular projection just ahead of a flow passage 29 leading to the usual regulating valve (not shown) in the outlet flow regulator.

In accordance with the present invention, a retainer cap is applied to the valve head 10 for retaining the O-ring 18 seated in the groove 17 in the valve head when the outlet flow regulator 21 is detached from the valve head. As already explained, the O-ring tends to pop out or drop out of the groove when the outlet flow regulator is detached from the valve head on the diver's tank. The invention protects the head valve during transportation and during usage of the valve.

In the presently-preferred embodiment, as shown, this retainer cap is a one-piece, molded hollow body of rubber-like material having a rectangular recess or cavity for snugly receiving the valve head 10. The retainer cap has a first pair of flat, opposite side walls 30 and 31, which respectively overlie the aforementioned side faces 15 and 19 of the valve head, and a second pair of flat, opposite side walls 32 and 33 extending perpendicular to the side walls 30, 31 and overlying the remaining side faces of the valve head. The retainer cap has a flat outer end wall 34 joined to its four side walls 30–33 and extending perpendicular to them. The opposite end of the retainer cap is open between its four side walls to permit it to be slidably inserted onto the valve head 10 from the latter's outer end.

The side wall 30 is thinner than the other walls of the retainer cap and is formed with a circular opening 35 which extends concentrically around the outlet port 12 in the adjacent side face of the valve head when the retainer cap is fitted on the valve head. The thin side wall 30 presents a resilient annular lip 36 surrounding this opening 35 which is of reduced thickness to make it easily flexible. The side wall 30 has an extension 30a on the opposite side of its opening 35 from the outer end wall 34 of the retainer cap.

As shown in FIGS. 2 and 4, when the retainer cap is on the valve head 10 and the outlet flow regulator 21 is detached from it, the thin annular lip 36 extends across the O-ring groove 17 in the valve head a sufficient amount to retain the O-ring 18 seated in the groove.

The opposite side wall 31 of the retainer cap has a circular opening 37 (FIGS. 4 and 5) which extends concentrically around the conical seat 20 in the adjacent side face 19 of the valve head 10 for permitting the inner end of the clamping screw 24 to engage this seat.

OPERATION

With the retainer cap in place on the valve head 10, as shown in FIGS. 2 and 4, the outlet flow regulator 21 may be attached to the valve head by slipping its yoke 22 over the outer end of the retainer cap. This is done when the clamping screw 24 is retracted from the position shown in FIG. 5, so that the mounting yoke 22 on the flow regulator can slip easily over the retainer cap on the valve head.

The annular projection 27 on the flow regulator is brought into registration with the O-ring groove 17 in the valve head 10, and at the same time the clamping screw 24 is brought into registration with the seat 20 in the adjacent side face 19 of the valve head. Then the clamping screw 24 is turned in a direction to pull the annular projection 27 on the flow regulator tightly against the O-ring 18 while the inner end 26 of the clamping screw 24 engages the seat 20. The O-ring 18 is deformed to provide a fluid-tight seal for preventing oxygen leakage between the valve head and the flow regulator.

Figure 5:
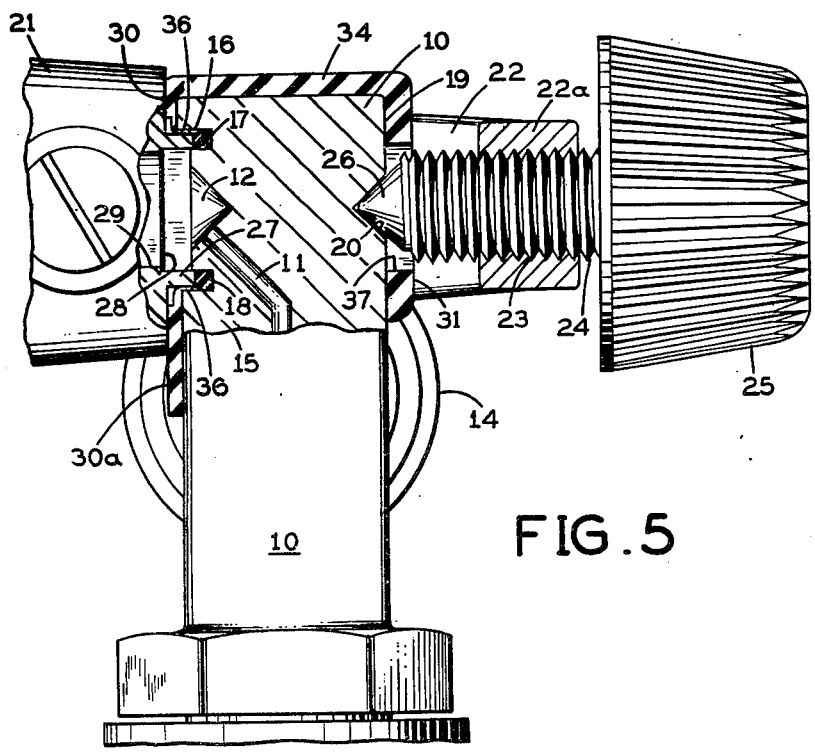
FIG. 5 is a section taken along the line 5—5 in FIG. 3 after the clamping screw has been fully tightened.

As shown in FIG. 5, when the annular projection 27 on the flow regulator is drawn into the O-ring groove 17, it first engages the flexible annular lip 36 on the retainer cap and deforms it outwardly to the position shown, where it is squeezed between the outer surface of the annular projection 27 and the outside wall surface of the recess 16 in the valve head. The lip 36, however, does not interfere with the deformation of the O-ring 18 which is necessary for it to provide an adequate gas-tight seal.

The outlet flow regulator 21 may be detached from the valve head 20 by reversing the foregoing sequence of steps. First, the clamping screw 24 is turned in the reverse direction, causing the annular projection 27 on the flow regulator to be backed out of the O-ring groove 17. Then, after continued reverse rotation of the clamping screw the yoke 22 may be slipped off the valve stem and retainer cap.

As soon as the annular projection 27 moves out past it, the flexible and resilient annular lip 36 on the retainer cap will snap back in to partially overlying relationship across the O-ring groove 17 and it will prevent the O-ring 18 from popping out or dropping out of this groove when the outlet flow regulator is disconnected from the valve stem and at all times the head valve will be afforded a high degree of protection.

I claim:

1. For use with a valve head on a diver's tank and an outlet flow regulator releasably attached to said valve head, said valve head having a flow passage therein leading from the interior of the tank and on one side thereof having an outlet port connected to said flow passage and an annular groove extending around said outlet port, a deformable resilient O-ring seated in said groove, and said outlet flow regulator having a rigid annular projection on its inlet side which fits into said groove and engages and deforms said O-ring when the outlet flow regulator is attached to the valve head, the improvement which comprises:

a retainer cap for said O-ring in the form of a hollow body shaped and dimensioned to fit snugly over said valve head, said cap having a side wall positioned to extend snugly across said one side of the valve head and having an opening therein which is aligned with said outlet port in the valve head when said cap is fitted on the valve head, said side wall of the retainer cap having a flexible and resilient annular lip around the periphery of said opening which extends inwardly across said annular groove in said one side of the valve head when the cap is fitted thereon, said annular lip being readily deformable outwardly by said rigid annular projection on the outlet flow regulator when the outlet flow regulator is attached to the valve head, and said annular lip springing back inwardly across said groove to retain the O-ring therein when the outlet flow regulator is detached from the valve head.

2. A retainer cap according to claim 1, wherein said lip is substantially thinner than the remainder of said side wall.

3. A retainer cap according to claim 1 which is a one-piece molded body of rubber-like material.

4. A retainer cap according to claim 2, wherein said hollow body has a rectangular cavity therein for snugly receiving the valve head which is open at the inner end of the cap for slidable insertion of the cap onto the valve head.

5. A retainer cap according to claim 2, wherein said hollow body has an opening at the opposite side from said first-mentioned side wall for passing a clamping screw on the outlet flow regulator.

6. A retainer cap according to claim 5 which is a one-piece molded body of rubber-like material having a rectangular cavity therein for snugly receiving the valve head which is open at the inner end of said cap for slidable insertion of the cap onto the valve head for preservation and protection of the head valve.

7. In combination with a valve head on a diver's tank and an outlet flow regulator releasably attached to said valve head, said valve head having a flow passage therein leading from the interior of the tank and on one side thereof having an outlet port connected to said flow passage and an annular groove extending around said outlet port, a deformable resilient O-ring seated in said groove, and said outlet flow regulator having a rigid annular projection on its inlet side which fits into said groove and engages and deforms said O-ring when the outlet flow regulator is attached to the valve head, the improvement which comprises:

- a retainer cap for said O-ring in the form of a hollow body fitting snugly over said valve head, said cap having a side wall extending snugly across said one side of the valve head and having an opening therein which is aligned with said outlet port in the valve head, said side wall of the retainer cap having a flexible and resilient annular lip around the periphery of said opening which extends inwardly across said annular groove in said one side of the valve head, said annular lip being deformed outwardly by said rigid annular projection on the outlet flow regulator when the outlet flow regulator is attached to the valve head, and said annular lip springing back across said groove to retain the O-ring therein when the outlet flow regulator is detached from the valve head.

8. The combination of claim 7, wherein said lip is substantially thinner than the remainder of said side wall.

9. The combination of claim 8, wherein said retainer cap is a one-piece molded body of rubber-like material with a rectangular cavity therein which snugly receives the valve head, said cavity being open at the inner end of the cap for slidable insertion of the cap onto the valve head.

10. The combination of claim 9, and further comprising:

- a rigid yoke on said outlet flow regulator straddling the valve head and extending to the opposite side of the valve head from the side where said outlet port is located;
- and a clamping screw threadedly extending through said yoke on said opposite side of the valve head for releasably clamping the outlet flow regulator on the valve head;
- said retainer cap having an opening therein which passes the inner end of said clamping screw for engagement with the valve head.

11. The combination of claim 7, and further comprising:

- a rigid yoke on said outlet flow regulator extending around the valve head to the opposite side of the latter from said outlet port;
- and a clamping screw threadedly extending through said yoke on said opposite side of the valve head for releasably clamping the outlet flow regulator on the valve head;
- said retainer cap having an opening therein which passes the inner end of said clamping screw for engagement with the valve head.

* * * * *